(12) United States Patent
Mulholland

(10) Patent No.: US 8,921,471 B2
(45) Date of Patent: Dec. 30, 2014

(54) LOW FORMALDEHYDE EMISSION POLYACETAL COMPOSITION

(75) Inventor: Bruce M. Mulholland, Hebron, KY (US)

(73) Assignee: Ticona LLC, Florence, KY (US)

(*) Notice: Subject to any disclaimer, the term of this patent is extended or adjusted under 35 U.S.C. 154(b) by 154 days.

(21) Appl. No.: 12/836,338

(22) Filed: Jul. 14, 2010

(65) Prior Publication Data

US 2011/0034610 A1 Feb. 10, 2011

Related U.S. Application Data

(60) Provisional application No. 61/232,183, filed on Aug. 7, 2009.

(51) Int. Cl.
 *C08K 5/13* (2006.01)
 *C08L 59/00* (2006.01)
 *C08K 3/08* (2006.01)

(52) U.S. Cl.
 CPC ..... *C08K 5/13* (2013.01); *C08K 3/08* (2013.01)
 USPC .......................................... 524/441; 528/270

(58) Field of Classification Search
 CPC ....................... C08L 59/00–59/04; C08K 5/13
 USPC ......................................................... 528/270
 IPC .............. C08L 59/00, 59/02, 59/04; C08K 3/08
 See application file for complete search history.

(56) References Cited

U.S. PATENT DOCUMENTS

| | | | |
|---|---|---|---|
| 2,772,247 A | 11/1956 | Schroeder | |
| 3,204,014 A | 8/1965 | Livingston | |
| 3,448,178 A | 6/1969 | Flanagan | |
| 4,526,921 A * | 7/1985 | Sakurai et al. | 524/405 |
| 4,544,600 A * | 10/1985 | Kern | 428/323 |
| 4,607,075 A | 8/1986 | Baum et al. | |
| 4,624,983 A | 11/1986 | Jarzombek et al. | |
| 4,672,083 A | 6/1987 | Amann et al. | |
| 4,731,397 A | 3/1988 | Auerbach et al. | |
| 4,810,733 A | 3/1989 | Sakuma et al. | |
| 5,043,398 A | 8/1991 | Auerbach et al. | |
| 5,096,951 A | 3/1992 | Auerbach | |
| 5,218,041 A | 6/1993 | Arnoldi et al. | |
| 5,338,815 A | 8/1994 | Aizawa et al. | |
| 5,407,996 A | 4/1995 | Aizawa et al. | |
| 5,455,042 A | 10/1995 | Sakai et al. | |
| 5,538,761 A | 7/1996 | Taylor | |
| 6,051,660 A | 4/2000 | Oka | |
| 6,165,407 A | 12/2000 | Tahara et al. | |
| 6,306,940 B1 | 10/2001 | Disch et al. | |
| 6,365,704 B1 | 4/2002 | Okawa et al. | |
| 6,398,861 B1 | 6/2002 | Knox | |
| 6,399,699 B1 | 6/2002 | Tanigawa et al. | |
| 6,512,047 B2 * | 1/2003 | Kim et al. | 525/66 |
| 6,627,691 B2 | 9/2003 | Mowrey et al. | |
| 6,642,289 B2 | 11/2003 | Harashina et al. | |
| 6,646,038 B1 | 11/2003 | Ali | |
| 6,699,923 B2 * | 3/2004 | Tanigawa et al. | 524/414 |
| 6,753,406 B2 | 6/2004 | Wulf et al. | |
| 6,770,340 B2 | 8/2004 | Zumbrunnen et al. | |
| 7,041,718 B2 | 5/2006 | Harashina et al. | |
| 7,070,624 B2 | 7/2006 | Holmes, III et al. | |
| 7,183,340 B2 | 2/2007 | Harashina et al. | |
| 7,186,766 B2 * | 3/2007 | Harashina et al. | 524/105 |
| 7,365,135 B2 | 4/2008 | Yang et al. | |
| 7,390,842 B2 | 6/2008 | Kieser et al. | |
| 7,442,742 B1 | 10/2008 | Smink et al. | |
| 7,449,239 B2 | 11/2008 | Seeger et al. | |
| 7,488,764 B2 | 2/2009 | Hobbs et al. | |
| 7,521,016 B2 | 4/2009 | Kayano et al. | |
| 8,034,855 B2 * | 10/2011 | Asai et al. | 524/99 |
| 2003/0162912 A1 | 8/2003 | Disch et al. | |
| 2004/0010064 A1 | 1/2004 | Harashina et al. | |
| 2004/0063853 A1 | 4/2004 | Disch et al. | |
| 2005/0119370 A1 | 6/2005 | Paul et al. | |
| 2007/0027300 A1 | 2/2007 | Zierer et al. | |
| 2007/0105989 A1 | 5/2007 | Disch et al. | |
| 2008/0242800 A1 | 10/2008 | Disch et al. | |
| 2008/0249224 A1 | 10/2008 | Seeger et al. | |
| 2008/0286472 A1 | 11/2008 | Tutin et al. | |
| 2008/0287580 A1 | 11/2008 | Disch et al. | |
| 2010/0280156 A1 * | 11/2010 | Hase | 524/91 |
| 2013/0078481 A1 | 3/2013 | Gronner et al. | |
| 2013/0085214 A1 | 4/2013 | Mulholland | |

FOREIGN PATENT DOCUMENTS

| | | |
|---|---|---|
| CN | 101130619 A * | 2/2008 |
| EP | 0882763 A1 | 12/1998 |
| EP | 0955337 | 10/1999 |
| EP | 1522554 A1 | 4/2005 |
| JP | 52059646 A | 5/1977 |
| JP | 55052338 A | 4/1980 |
| JP | 59086614 A | 5/1984 |
| JP | 60086155 A | 5/1985 |
| JP | 60090250 A | 5/1985 |
| JP | 61-036339 | 2/1986 |
| JP | 61145245 A | 7/1986 |
| JP | 61291616 A | 12/1986 |
| JP | 62-190249 | 8/1987 |
| JP | 62201922 A | 9/1987 |
| JP | 63260949 A | 10/1988 |
| JP | 2080416 A | 3/1990 |
| JP | 02-140243 | 5/1990 |
| JP | 2024307 B | 5/1990 |
| JP | 2281046 A | 11/1990 |

(Continued)

OTHER PUBLICATIONS

Marplex (IUPITAL Acetal Copolymer F20, Nov. 2000, 2 pages).*

(Continued)

*Primary Examiner* — Brieann R Fink
(74) *Attorney, Agent, or Firm* — Dority & Manning, P.A.

(57) ABSTRACT

A polymeric composition containing a polyacetal resin in conjunction with a formaldehyde inhibiting agent is described. The formaldehyde inhibiting agent comprises an aluminum pigment. The aluminum pigment may comprise elemental aluminum, such as aluminum flakes that cannot only drastically reduce formaldehyde emissions from the composition but can also give the composition a metallic appearance. In one embodiment, the aluminum pigment may be combined with the polyacetal resin in conjunction with an unhindered phenol and/or a polyethylene resin. In order to further reduce formaldehyde emissions, in one embodiment, a formaldehyde scavenger comprising a nitrogen containing compound can also be added.

15 Claims, No Drawings

(56) References Cited

FOREIGN PATENT DOCUMENTS

| | | | |
|---|---|---|---|
| JP | 5098039 A | 4/1993 |
| JP | 6049181 A | 2/1994 |
| JP | 06-256623 | 9/1994 |
| JP | 7053770 A | 2/1995 |
| JP | 7173368 A | 7/1995 |
| JP | 7292214 A | 11/1995 |
| JP | 7331028 A | 12/1995 |
| JP | 08-120115 | 5/1996 |
| JP | 8208946 A | 8/1996 |
| JP | 8311302 A | 11/1996 |
| JP | 09-076272 | 3/1997 |
| JP | 10-182928 | 7/1998 |
| JP | 11-021376 | 1/1999 |
| JP | 11-335518 | 12/1999 |
| JP | 2000-026704 | 1/2000 |
| JP | 2000351822 A | 12/2000 |
| JP | 2001072830 A | 3/2001 |
| JP | 2001131386 A | 5/2001 |
| JP | 2001247745 A | 9/2001 |
| JP | 2003-113289 | 4/2003 |
| JP | 2005-112995 | 4/2005 |
| JP | 2007-084714 | 4/2007 |
| JP | 2011-140577 | 7/2011 |
| WO | WO 2004/046244 A1 | 6/2004 |
| WO | WO 2004046244 A1 * | 6/2004 |
| WO | WO 2009/081517 A1 | 7/2009 |
| WO | WO 2009081517 A1 * | 7/2009 |
| WO | WO 2011129445 A1 * | 10/2011 |

OTHER PUBLICATIONS

Machine translation of CN 101130619.*

* cited by examiner

LOW FORMALDEHYDE EMISSION POLYACETAL COMPOSITION

RELATED APPLICATIONS

The present application is based upon and claims priority to U.S. Provisional Patent Application No. 61/232,183, filed on Aug. 7, 2009.

BACKGROUND

Polyacetal polymers, which are commonly referred to as polyoxymethylenes (POMs), have become established as exceptionally useful engineering materials in a variety of applications. POMs for instance, are widely used in constructing molded parts, such as parts for use in the automotive industry and the electrical industry. POMs, for instance, have excellent mechanical property, fatigue resistance, abrasion resistance, chemical resistance, and moldability.

Although polyacetal resins possess many useful properties, the polymers have a tendency to degrade when heated and are inherently unstable in an oxidative atmosphere or in an acidic or alkaline environment. In particular, polyacetal resins have a tendency to emit formaldehyde during processing and after the polymer has been molded into a part. Formaldehyde is not only a contaminant, but can also adversely affect metallic components that may be placed in association with the polymer. For example, formaldehyde readily oxidizes to formic acid which can corrode metals or cause discoloration.

In view of the above, those skilled in the art have suggested using various stabilizers in molding compositions containing polyacetal polymers in order to suppress degradation. For example, various stabilizers are disclosed in JP-08208946, in Japanese Patent Application Kokai No. 60-90,250, in Japanese Patent Application Kokai No. 7-173,368 and in Japanese Patent Application No. 7-331,028. Various stabilizers that have been proposed in the past include, for instance, nitrogen containing compounds such as a dicyandiamide or an amino-substituted triazine compound.

Unfortunately, however, the above stabilizers have a tendency to bleed or migrate to the surface of molded articles, thereby forming surface imperfections. Thus, a balance typically has to be established between reducing formaldehyde emission and in producing an article with desired properties. In U.S. Pat. No. 6,051,660, for instance, controlled amounts of amino-substituted triazines are added to polyacetal resins containing from 1000 to 3000 ppm of formaldehyde.

Problems associated with maintaining the properties of the polymer in conjunction with reducing formaldehyde emission can become exacerbated when attempting to incorporate a colorant into the polymer mixture. For example, in the past, only a limited number of colorants have been suggested for use in pigmenting polyacetal polymers without adverse effect on the properties of the material and/or the product.

For example, U.S. Pat. No. 6,306,940 is directed to colorant concentrates for dyeing polyoxymethylene molding materials. The above patent teaches the use of a colorant in conjunction with a nitrogen-containing stabilizer and a dispersion aid for producing colored injection moldings or extrudates that are particularly stable during processing and have low formaldehyde emissions.

U.S. Pat. No. 7,186,766 is directed to the use of a phenol component and/or an amino acid in conjunction with a polyacetal resin with or without a colorant in order to inhibit formaldehyde emission.

U.S. Patent Application Publication No. 2008/0287580 teaches that adding colorants to polyoxymethylene polymers can lead to the breakdown of the material during processing with subsequent release of formaldehyde. In this regard, the above patent application teaches the use of a colorant in combination with a nitrogen-containing stabilizer, an ester of a polyhydric alcohol and at least one fatty acid, and a metal salt of a fatty acid in polyoxymethylene molding compositions in order to increase stability, lower formaldehyde emission, produce defect-free surfaces, and produce high color-fastness.

U.S. Pat. No. 7,449,239 is directed to coated metallic luster pigments for pigmenting high molecular weight materials. The '239 patent discloses coating a metal platelet, such as aluminum flakes with a low refractive dielectric layer which does not absorb visible light for pigmenting the polymer materials.

Although the above identified patents and patent applications have provided some advances in the art, a need still exists for an improved molding composition containing a polyacetal resin that has reduced formaldehyde emissions. In addition, a need also exists for a method of incorporating a colorant or pigment into a polyacetal polymer that does not increase formaldehyde emission levels or adversely affect the physical properties of the polymer, such as by causing surface defects.

SUMMARY

In general, the present disclosure relates to pigmented polyacetal compositions exhibiting low formaldehyde emissions. In accordance with the present disclosure, the compositions are formed by combining a polyacetal resin with an aluminum pigment. For example, it was unexpectedly discovered that an aluminum pigment, once incorporated into a polyacetal resin, can actually decrease formaldehyde emissions. In particular, the aluminum pigment has been found not only to cause a decrease in formaldehyde emissions from a polyacetal polymer, but can also provide the polymer with a colored and/or metallic appearance. Specifically, an aluminum pigment has been found to reduce formaldehyde emissions by up to about 30 percent, such as by up to about 45 percent, such as up to about 70 percent once incorporated into the polyacetal polymer. For instance, in one embodiment, the aluminum pigment may reduce formaldehyde emissions from the polyacetal polymer in an amount from about 50 percent to about 70 percent. Formaldehyde emission, for instance, can be measured according to VDA 275 (German Automotive Industry Recommendation No. 275) as documented by Kraftfahrwesen e. V., July 1994.

In one embodiment, various other additives can also be present in the polymer composition, such as a phenol polymer, a polyolefin resin, and/or a formaldehyde scavenger. Ultimately, a composition can be produced that has a formaldehyde emission that has been reduced from about 20 ppm to about 150 ppm down to from about 2 ppm to about 10 ppm. For instance, in one embodiment, formaldehyde emissions may be reduced from about 20 ppm to about 150 ppm down to from about 1 ppm to about 10 ppm. In still another embodiment, the formaldehyde emission may be reduced from about 20 ppm to about 50 ppm down to about 2 ppm to about 7 ppm. It is believed that the aluminum pigment can synergistically interact with the other additives in reducing formaldehyde emission. In one particular embodiment, for instance, the resulting formulation can have a formaldehyde emission pursuant to VDA 275 from about 1 ppm to about 3 ppm.

In one embodiment, the present disclosure is directed to a polymeric composition that includes a polymer matrix comprised of a polyacetal resin. In accordance with the present disclosure, the polyacetal resin has an initial formaldehyde content of less than about 1,000 ppm, such as from about 20 ppm to about 500 ppm, such as from about 20 ppm to about 250 ppm, such as from about 20 ppm to about 150 ppm. The polymer matrix is blended with an aluminum pigment that comprises elemental aluminum. For example, in one embodiment, the aluminum pigment comprises aluminum flakes. Once incorporated into the polymer matrix, the aluminum flakes form intimate contact (i.e. uncoated once dispersed) with the polyacetal resin. The aluminum pigment is present in an amount sufficient not only to produce a product having a colored, sparkled, and/or metallescent appearance, but also in an amount sufficient to reduce formaldehyde emissions by the composition.

In one embodiment, in addition to the aluminum pigment, the composition can also contain a phenol and/or a polyolefin resin. The phenol, for instance, may comprise an unhindered phenol, such as a terpene phenol. The terpene phenol, for example, may have the following formula:

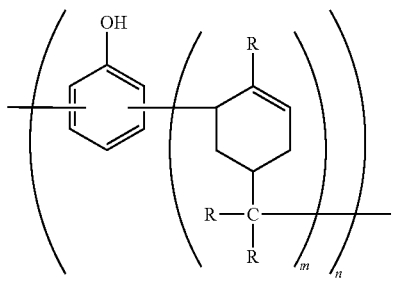

wherein R is a methyl group and m and n are integers indicating the respective degree of polymerization and are from about 2 to about 10. In one embodiment, the phenol may be present in the composition in amount from about 0.5 percent to about 2 percent by weight.

As described above, the polymeric composition may also contain a polyolefin resin, such as a polyethylene resin. The polyethylene resin, for example, may be present in the composition in an amount of from about 0.01 percent to about 4 percent by weight. The polyethylene resin can have a molecular weight of less than about 15,000, such as from about 2,000 to about 15,000.

In one embodiment, in order to further reduce formaldehyde emissions, a formaldehyde scavenger, such as a nitrogen compound can also be combined with the other components. In this regard, further reductions in formaldehyde emissions may be possible when a nitrogen containing compound is present. The nitrogen containing compound, for instance, may comprise a heterocyclic compound having at least one nitrogen atom adjacent to an amino-substituted carbon atom or a carbonyl group. For instance, examples of nitrogen containing compounds that may be used include amino-substituted triazines. In one particular embodiment, the nitrogen containing compound may comprise a guanamine, such as benzoguanamine.

When present, the formaldehyde scavenger can be present in the composition in an amount generally less than 2 percent by weight, such as from about 0.01 percent to about 2 percent by weight, such as from about 0.05 percent to about 0.5 percent by weight. The formaldehyde scavenger, for instance, should be added in amounts insufficient for the material to plate out and produce surface imperfections when producing molded articles. By using small amounts of the formaldehyde scavenger in conjunction with a polyacetal resin having a relatively low initial formaldehyde content (such as from about 20 ppm to less than about 1000 ppm, such as less than 500 ppm), the formaldehyde scavenger can be fully dispersed within the resulting composition and may even be solubulized in the composition during the formation of molded parts. In this regard, in one embodiment, the formaldehyde scavenger may have no perceived particle size within the resulting product.

Polymeric compositions made according to the present disclosure can be used in numerous applications. For instance, in one embodiment, the composition may be used to form various molded parts for use in all different types of industries. In one particular embodiment, for instance, the composition may be used in producing automotive parts.

In producing products in accordance with the present disclosure, the composition may also contain various other additives, such as colorants, light stabilizers, antioxidants, heat stabilizers, processing aids, gloss agents, and fillers.

Other features and aspects are discussed in greater detail below.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to pigmented polymer compositions that contain a polyacetal polymer. The polymer compositions can be used to produce various articles, such as molded parts. Of particular advantage, polymer articles can be produced that not only have excellent pigment dispersion, but also can have a relatively low formaldehyde emission. Further, these properties can be obtained without significantly adversely affecting the physical properties of the polymer and while avoiding the occurrence of any significant surface defects.

Generally speaking, the polymeric compositions made in accordance with the present disclosure comprise a polyacetal resin combined with an aluminum pigment and optionally with an unhindered phenol. The aluminum pigment, which may comprise elemental aluminum, has been found to reduce formaldehyde emissions that may evolve from the polyacetal polymer. In addition, the aluminum pigment provides the polyacetal polymer with a colored, sparkled, and/or metallescent appearance. Even further reductions in formaldehyde emissions can be achieved by incorporating other components into the polymeric compositions. For example, further reductions in formaldehyde emissions can occur if the aluminum pigment is synergistically combined with a phenol, such as an unhindered phenol, and/or a polyolefin resin, such as a polyethylene resin. An even further reduction in formaldehyde emissions can also be obtained in some embodiments if a formaldehyde scavenger, such as a nitrogen containing compound, is further added to the composition.

Ultimately, a polymer composition containing a polyacetal polymer can be produced according to the present disclosure that exhibits a formaldehyde emission pursuant to VDA 275 of from about 1 ppm to about 10 ppm, such as from about 1 ppm to about 7 ppm, such as from about 1 ppm to about 3 ppm (especially when using a polyacetal resin having an initial formaldehyde content of less than about 1000 ppm as described below).

The aluminum pigment alone, for instance, can reduce formaldehyde emissions by from about 20 percent up to about 70 percent, such as from about 40 percent to about 60 percent. A polyacetal resin containing aluminum pigment alone, for instance, can have a formaldehyde emission of from about 10 ppm to about 7 ppm.

Polymer compositions made according to the present disclosure include a polymer matrix that is primarily comprised of a polyacetal resin, which is also commonly referred to as a polyoxymethylene polymer. In general, any suitable polyacetal resin can be used in accordance with the present disclosure. In one particular embodiment, a polyacetal resin is used that contains a relatively low amount of formaldehyde content. For example, the polyacetal resin can have an initial formaldehyde content of less than about 1,000 ppm, such as from about 20 ppm to about 500 ppm. For example, the polyacetal resin can contain formaldehyde in an amount from about 20 ppm to about 250 ppm, such as from about 20 ppm to about 150 ppm.

The polyacetal resin may comprise a homopolymer or a copolymer and can include end caps. The homopolymers may be obtained by polymerizing formaldehyde or trioxane, which can be initiated cationically or anionically. The homopolymers can contain primarily oxymethylene units in the polymer chain. Polyacetal copolymers, on the other hand, may contain oxyalkylene units along side oxymethylene units. The oxyalkylene units may contain, for instance, from about 2 to about 8 carbon units and may be linear or branched. In one embodiment, the homopolymer or copolymer can have hydroxy end groups that have been chemically stabilized to resist degradation by esterification or by etherification.

As described above, the homopolymers are generally prepared by polymerizing formaldehyde or trioxane, preferably in the presence of suitable catalysts. Examples of particularly suitable catalysts are boron trifluoride and trifluoromethanesulfonic acid.

Polyoxymethylene copolymers can contain alongside the —CH$_2$O— repeat units, up to 50 mol %, such as from 0.1 to 20 mol %, and in particular from 0.5 to 10 mol %, of repeat units of the following formula

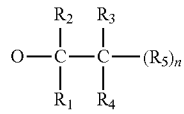

where R$^1$ to R$^4$, independently of one another, are a hydrogen atom, a C$_1$-C$_4$-alkyl group, or a halo-substituted alkyl group having from 1 to 4 carbon atoms, and R$^5$ is —CH$_2$—, —O—CH$_2$—, or a C$_1$-C$_4$-alkyl- or C$_1$-C$_4$-haloalkyl-substituted methylene group, or a corresponding oxymethylene group, and n is from 0 to 3.

These groups may advantageously be introduced into the copolymers by the ring-opening of cyclic ethers. Preferred cyclic ethers are those of the formula

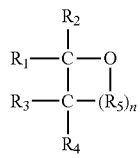

where R$^1$ to R$^5$ and n are as defined above.

Cyclic ethers which may be mentioned as examples are ethylene oxide, propylene 1,2-oxide, butylene 1,2-oxide, butylene 1,3-oxide, 1,3-dioxane, 1,3-dioxolane, and 1,3-dioxepan, and comonomers which may be mentioned as examples are linear oligo- or polyformals, such as polydioxolane or polydioxepan.

Use is also made of oxymethyleneterpolymers, for example those prepared by reacting trioxane with one of the abovementioned cyclic ethers and with a third monomer, preferably a bifunctional compound of the formula

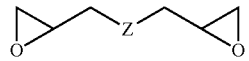

where Z is a chemical bond, —O— or —ORO— (R═C$_1$-C$_8$-alkylene or C$_2$-C$_8$-cycloalkylene).

Preferred monomers of this type are ethylene diglycide, diglycidyl ether, and diethers composed of glycidyl units and formaldehyde, dioxane, or trioxane in a molar ratio of 2:1, and also diethers composed of 2 mol of glycidyl compound and 1 mol of an aliphatic diol having from 2 to 8 carbon atoms, for example the diglycidyl ethers of ethylene glycol, 1,4-butanediol, 1,3-butanediol, 1,3-cyclobutanediol, 1,2-propanediol, or 1,4-cyclohexene diol, to mention just a few examples.

Polyacetal resins as defined herein can also include end capped resins. Such resins, for instance, can have pendant hydroxyl groups. Such polymers are described, for instance, in U.S. Pat. No. 5,043,398, which is incorporated herein by reference.

In one embodiment, the polyacetal polymer may contain hemiformal terminal groups and/or formyl terminal groups. In particular, it is believed that the methods of the present disclosure can advantageously significantly reduce formaldehyde emissions of polyacetal polymers, even when the polymers contain hemiformal terminal groups and possibly formyl terminal groups. For instance, in one embodiment, the polyacetal polymer may contain hemiformal terminal groups in amounts greater than 1.0 mmol/kg, such as in amounts greater than 1.5 mmol/kg. In an alternative embodiment, the polyacetal polymer may contain formyl terminal groups in amounts greater than 2 mmol/kg, such as in amounts greater than 2.5 mmol/kg.

The processes used to form the polyoxymethylene polymers as described above can vary depending upon the particular application. A process, however, can be used which results in a polyacetal resin having a relatively low formaldehyde content. In this regard, in one embodiment, the polymer can be made via a solution hydrolysis process as may be described in U.S. Patent Application Publication Number 2007/0027300 and/or in United States Patent Application Number 2008/0242800, which are both incorporated herein by reference. For instance, in one embodiment, a polyoxymethylene polymer containing aliphatic or cycloaliphatic diol units can be degraded via solution hydrolysis by using methanol and water with triolethylene.

Polyacetal resins or polyoxymethylenes that may be used in accordance with the present disclosure generally have a melting point of greater than about 150 degrees C. The molecular weight of the polymer can generally range from about 2,000 to about 1,000,000, such as from about 7,000 to about 150,000. The polymer can have a meltflow rate (MVR 190-2.16) from about 0.3 to about 20 g/10 min, and particularly from about 2 to about 9 g/10 min (ISO 1133).

A polyacetal resin as described above is combined with an aluminum pigment in accordance with the present disclosure in order to reduce formaldehyde emissions. The aluminum pigment generally contains elemental aluminum. The aluminum can be present in any suitable form. For example, the aluminum pigment may have a rod-Like shape, acicular shape, a granular shape, or a spherical shape. In one particular embodiment, the aluminum particles have a plate-like shape and may comprise, for instance, aluminum flakes. In this regard, the aluminum particles can have an aspect ratio of greater than about 4 to 1, such as greater than about 8 to 1, such as from about 10 to 1 to about 50 to 1.

The amount of the aluminum pigment incorporated into the polymer composition of the present disclosure can vary based on numerous factors. For example, the amount of aluminum pigment added to the polymer may depend upon a desired reduction in formaldehyde emission and/or desired look or appearance of the resulting mixture. In general, the aluminum pigment can be present in the polymer composition in an amount from about 0.5 percent to about 12 percent by weight. When present in relatively higher amounts, the resulting polymer mixture can display a metallescent appearance.

In order to incorporate the aluminum pigment into the polymer, in one embodiment, the components can be melt blended during the production of a molded article. In another embodiment, the aluminum pigment can be partially compounded with the polyacetal resin and then added to further amounts of polyacetal resin during melt processing such as during extruding or during molding.

The presence of an aluminum pigment in a polymer matrix containing a polyacetal resin has been found to significantly reduce formaldehyde emissions. Further reductions in formaldehyde emissions can occur by including other ingredients into the mixture. For instance, in one embodiment, a phenol, such as an unhindered phenol can be combined with the polyacetal resin and the aluminum pigment. Phenols that may be incorporated into the composition include terpene phenols and/or various unhindered phenolic oligomers and polymers. For example, such phenols include novolacs, such as cresol novolac, a resole, bis-A oligomers, poly(4-hydroxy styrene), or mixtures thereof.

Terpene phenol resins comprise copolymers of a terpene and a phenol. Terpenes are hydrocarbons expressed by the formula $(C_5H_8)_n$ or an acid-containing compound derived therefrom, such as monoterpenes (when n=2, examples include myrcene, ocimene, pinene, limonene, citroneol, borneol, menthol, and camphor), sesquiterpenes (when n=3, examples include curcumin), diterpenes (when n=4, examples include camphorene and hinokiol), tetraterpenes (when n=8, examples include carotenoids), and polyterpenes (natural rubber). The preferred terpenes are monoterpenes, particularly pinene, limonene, etc.

Phenols are compounds having at least one hydroxyl group on an aromatic ring such as a benzene ring or naphthalene ring, and they may also have a substituent on the aromatic ring (such as a halogen atom or an alkyl group). Examples include phenol, cresol, xylenol, naphthol, catechol, resorcinol, hydroquinone, and pyrogallol.

In one embodiment, the terpene phenol resin is a copolymer of a monoterpene and phenol. A copolymer of a monoterpene such as alpha-pinene or limonene and phenol, for instance, can be manufactured on an industrial scale. In the case of a copolymer of limonene and phenol, an example of a possible structural formula is as follows:

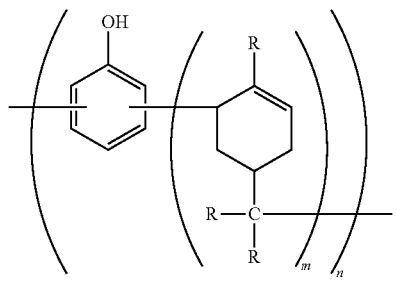

wherein in the formula, R indicates a methyl group, and m and n are integers indicating the respective degree of polymerization, preferably integers from about 2 to about 10.

In the present disclosure, the terpene phenol resin can have a hydroxyl value of 45 or above, such as 50 or above. There are no particular limitations on the upper limit value, but it should be 250 or less for the purposes of practical application. Moreover, the hydroxyl value indicates the number of mg of potassium hydroxide required to neutralize acetic acid bound to a hydroxyl group when 1 g of the sample is acetylated.

In an alternative embodiment, the phenol resin may comprise a nonyl-phenyl phosphite. For instance, tris (nonyl-phenol) phosphate may be used which is referred to as TNPP.

As described above, in one embodiment, the phenol comprises an unhindered phenolic oligomer or polymer, such as a novolac. A novolac, for instance, can comprise any resin produced by reacting phenol with formaldehyde in the presence of excess phenol. One example of a novolac that may be used in the present disclosure is cresol novolac.

More particularly, phenolic novolac resins that may be used include polyhydroxy phenolic resin copolymers which comprise a phenolic resin prepared from certain multihydroxy aromatic compounds and a formaldehyde source. The phenolic resin copolymer can be prepared by combining a monohydroxy and/or a dihydroxy aromatic compound with a trihydroxy aromatic compound and a formaldehyde source. The monohydroxy, dihydroxy and trihydroxy aromatic compounds of the present invention can be essentially any aromatic compound having one, two and three hydroxy substituents, respectively. The aromatic compound is preferably benzene, and the other non-hydroxy substituents on the benzene ring or other aromatic compound may be hydrogen, alkyl, aryl, alkylaryl, arylalkyl carboxy, alkoxy, amide, imide, halogen or the like. The non-hydroxy substituents are most preferably hydrogen and, if alkyl, are preferably lower alkyls having from 1 to 10 carbon atoms including methyl, ethyl, propyl, amyl, and nonyl. Representative monohydroxy compounds include phenol, p-t-butyl phenol, p-phenylphenol, p-chloro-phenol, p-alkoxyphenol, O-cresol, m-cresol, o-chlorophenol, m-bromo-phenol, 2-ethylphenol, amyl phenol, and nonyl phenol, with phenol, p-t-butyl phenol and nonyl phenol, being preferred. Representative dihydroxy compounds include resorcinol, hydroquinone and catechol with resorcinol being the preferred dihydroxy aromatic compound. The monohydroxy aromatic compound, dihydroxy aromatic compound or combination thereof comprises the first phenolic component and is utilized in the invention in an amount from about 1 to about 97, preferably from about 75 to about 95 percent by weight of the ingredients (excluding solvent) utilized to prepare the phenolic resin copolymer.

Representative trihydroxy compounds include pyrogallol, gallates such as propyl gallate, robinerin, baptigenin and anthragallol, with pyrogallol being the preferred trihydroxy aromatic compound. The trihydroxy aromatic compound comprises the second phenolic component and is utilized in the invention in an amount from about 1 to about 97, preferably from about 2 to about 25 percent by weight of the ingredients (excluding solvent) utilized to prepare the phenolic resin copolymer.

The formaldehyde source can essentially be any type of formaldehyde known to react with hydroxy aromatic compounds to form novolak phenolic resins. Typical compounds useful as a formaldehyde source in the present invention include formaldehyde and aqueous solutions of formaldehyde, such as formalin; acetaldehyde; propionaldehyde; isobutyraldehyde; 2-ethylbutyraldehyde; 2-methylpentaldehyde; 2-ethylhexyldehyde; benzaldehyde; as well as compounds which decompose to formaldehyde, such as paraformaldehyde, trioxane, furfural, hexamethylenetetramine; acetals which liberate formaldehyde on heating; and the like. The formaldehyde source is utilized in an amount ranging from about 1 to about 25, preferably from about 5 to about 20 percent by weight of the ingredients utilized to prepare the phenolic resin copolymer.

A phenolic resole resin, on the other hand, can comprise a condensation product of an aldehyde compound with a phenolic compound. The phenolic resole resin can contain methylene bridging groups as well as alcohol groups.

In general, the phenol resin can be present in the polymer composition in an amount up to about 4 percent by weight, such as from about 0.01 percent to about 2 percent by weight. In one embodiment, the phenol can be melt blended with the other components. Alternatively, the phenol may be compounded with the aluminum pigment prior to addition to the polyacetal polymer. Compounding the aluminum pigment with phenol, for instance, may improve the handling characteristics of the aluminum pigment. In still another embodiment, the aluminum pigment may be compounded with both the polyacetyl polymer and the phenol. In this embodiment, the compounded pigment may then be added to further amounts of the polyacetal resin.

Another additive that may be included in the polymeric composition of the present disclosure is a polyolefin resin. The polyolefin resin is believed to synergistically combine with the aluminum pigment and/or the phenol in further reducing formaldehyde emissions. The polyolefin resin may comprise, for instance, any suitable polyolefin, such as a homopolymer or copolymer of polypropylene or polyethylene. In one particular embodiment, for instance, the polyolefin resin comprises polyethylene having a molecular weight of from about 2000 to about 15,000. When present, the polyolefin resin can be incorporated in the polymeric composition in an amount less than about 4 percent by weight, such as from about 0.05 percent to about 3.6 percent by weight.

The polyolefin resin can be melt blended with the other ingredients that comprise the polymeric composition or can be compounded with the aluminum pigment prior to being combined with the polyacetal polymer. In still another embodiment, the polyolefin resin can be compounded with the aluminum pigment in conjunction with at least a portion of the polyacetal polymer.

The polyolefin resin can be present in the polymeric composition in combination with a phenol or in the absence of a phenol. When present in conjunction with a phenol, in one embodiment, the phenol and the polyolefin resin may be precompounded with the aluminum pigment to form pellets or granules. The pellets or granules can then be melt processed with a polyacetal polymer.

In order to further reduce formaldehyde emissions from the polymeric composition, the composition can contain a formaldehyde scavenger, such as a nitrogen containing compound.

A formaldehyde scavenger is a compound that reacts and binds formaldehyde. When incorporating a nitrogen containing compound into the composition, the initial formaldehyde content of the polyacetal polymer is desirably low. For example, by using a polyacetal polymer that has an initial formaldehyde content of less than about 500 ppm, the nitrogen composition becomes well dispersed within the polymer and, in fact, has been found to solubilize within the polymer. In the past, on the other hand, when using polyacetal polymers having higher formaldehyde content, problems were experienced in getting the nitrogen containing compound into the polymer in a mariner that did not interfere with other properties of the polymer. For instance, when using polyacetal polymers having higher formaldehyde content, the nitrogen containing compound may form particles within the resulting polymer matrix. In comparison, nitrogen containing compounds incorporated into compositions made according to the present disclosure can become finely dispersed within the resulting polymer having particle sizes less than 1 micron, or even preferably, having no distinguishable particle size.

In general, the total amount of formaldehyde scavengers present in the composition is relatively small. For instance, the formaldehyde scavengers can be present in an amount less than about 2 percent by weight, such as from about 0.01 percent to about 2 percent by weight, such as from about 0.05 percent to about 0.5 percent by weight (which excludes other nitrogen containing compounds that may be present in the composition that are not considered formaldehyde scavengers such as waxes or hindered amines). Any suitable formaldehyde scavenger can be included into the composition including, for example, aminotriazine compounds, allantoin, hydrazides, polyamides, melamines, or mixtures thereof. In one embodiment, the nitrogen containing compound may comprise a heterocyclic compound having at least one nitrogen atom adjacent to an amino substituted carbon atom or a carbonyl group. In one specific embodiment, for instance, the nitrogen containing compound may comprise benzoguanamine.

In still other embodiments, the nitrogen containing compound may comprise a melamine modified phenol, a polyphenol, an amino acid, a nitrogen containing phosphorus compound, an acetoacetamide compound, a pyrazole compound, a triazole compound, a hemiacetal compound, other guanamines, a hydantoin, a urea including urea derivatives, and the like.

The nitrogen containing compound may comprise a low molecular weight compound or a high molecular weight compound. The nitrogen-containing compound having a low molecular weight may include, for example, an aliphatic amine (e.g., monoethanolamine, diethanolamine, and tris-(hydroxymethyl)aminomethane), an aromatic amine (e.g., an aromatic secondary or tertiary amine such as o-toluidine, p-toluidine, p-phenylenediamine, o-aminobenzoic acid, p-aminobenzoic acid, ethyl o-aminobenzoate, or ethyl p-aminobenzoate), an imide compound (e.g., phthalimide, trimellitimide, and pyromellitimide), a triazole compound (e.g., benzotriazole), a tetrazole compound (e.g., an amine salt of 5,5'-bitetrazole, or a metal salt thereof), an amide compound (e.g., a polycarboxylic acid amide such as malonamide or isophthaldiamide, and p-aminobenzamide), hydrazine or a derivative thereof [e.g., an aliphatic carboxylic acid hydrazide such as hydrazine, hydrazone, a carboxylic acid hydrazide (stearic hydrazide, 12-hydroxystearic hydrazide, adipic dihydrazide, sebacic dihydrazide, or dodecane diacid dihydrazide; and an aromatic carboxylic acid hydrazide such as benzoic hydrazide, naphthoic hydrazide, isophthalic dihydrazide, terephthalic dihydrazide, naphthalenedicarboxylic dihydrazide, or benzenetricarboxylic trihydrazide)], a polyaminotriazine [e.g., guanamine or a derivative thereof, such as guanamine, acetoguanamine, benzoguanamine, succinoguanamine, adipoguanamine, 1,3,6-tris(3,5-diamino-2, 4,6-triazinyl)hexane, phthaloguanamine or CTU-guanamine, melamine or a derivative thereof (e.g., melamine, and a condensate of melamine, such as melam, melem or melon)], a salt of a polyaminotriazine compound containing melamine and a melamine derivative with an organic acid [for example, a salt with (iso)cyanuric acid (e.g., melamine cyanurate)], a salt of a polyaminotriazine compound containing melamine and a melamine derivative with an inorganic acid [e.g., a salt with boric acid such as melamine borate, and a salt with phosphoric acid such as melamine phosphate], uracil or a derivative thereof (e.g., uracil, and uridine), cytosine and a derivative thereof (e.g., cytosine, and cytidine), guanidine or a derivative thereof (e.g., a non-cyclic guanidine such as guanidine or cyanoguanidine; and a cyclic guanidine such as creatinine), urea or a derivative thereof [e.g., biuret, biurea, ethylene urea, propylene urea, acetylene urea, a derivative of acetylene urea (e.g., an alkyl-substituted compound, an aryl-substituted compound, an aralkyl-substituted compound, an acyl-substituted compound, a hydroxymethyl-substituted compound, and an alkoxymethyl-substituted compound), isobutylidene diurea, crotylidene diurea, a condensate of urea with formaldehyde, hydantoin, a substituted hydantoin derivative (for example, a mono or $diC_{1-4}$alkyl-substituted compound such as 1-methylhydantoin, 5-propylhydantoin or 5,5-dimethylhydantoin; an aryl-substituted compound such as 5-phenylhydantoin or 5,5-diphenylhydantoin; and an alkylaryl-substituted compound such as 5-methyl-5-phenylhydantoin), allantoin, a substituted allantoin derivative (e.g., a mono, di or $triC_{1-4}$alkyl-substituted compound, and an aryl-substituted compound), a metal salt of allantoin (e.g., a salt of allantoin with a metal element of the Group 3B of the Periodic Table of Elements, such as allantoin dihydroxyaluminum, allantoin monohydroxyaluminum or allantoin aluminum), a reaction product of allantoin with an aldehyde compound (e.g., an adduct of allantoin and formaldehyde), a compound of allantoin with an imidazole compound (e.g., allantoin sodium dl-pyrrolidinecarboxylate), an organic acid salt].

The nitrogen-containing resin may include, for example, a homo- or copolymer of a polyvinylamine, a homo- or copolymer of a polyallylamine, an amino resin obtainable from a reaction by using formaldehyde (e.g., a condensation resin such as a guanamine resin, a melamine resin or a guanidine resin; a co-condensation resin such as a phenol-melamine resin, a benzoguanamine-melamine resin or an aromatic polyamine-melamine resin), an aromatic amine-formaldehyde resin (e.g., aniline resin), a polyamide resin (e.g., a homo- or copolymerized polyamide such as nylon 3 (poly-β-alanine), nylon 46, nylon 6, nylon 66, nylon 11, nylon 12, nylon MXD6, nylon 6-10, nylon 6-11, nylon 6-12, or nylon 6-66-610, a substituted polyamide containing a methylol or alkoxymethyl group), a polyesteramide, a polyamideimide, a polyurethane, a poly(meth)acrylamide, a copolymer of (meth)acrylamide and other vinyl monomer, a poly(vinyllactam), a copolymer of vinyllactam and other vinyl monomer (for example, homo- or copolymers described in Japanese Patent Application Laid-Open No. 52338/1980 (JP-55-52338A), and U.S. Pat. No. 3,204,014)), a poly(N-vinylformamide) or a derivative thereof (e.g., an N-vinylformamide-N-vinylamine copolymer) (for example, trade name "PNVE Series" manufactured by Mitsubishi Chemical Corporation), a copolymer of N-vinylformamide and other vinyl monomer, a poly(N-vinylcarboxylic acid amide), a copolymer of N-vinylcarboxylic acid amide and other vinyl monomer (for example, homo- or copolymers described in Japanese Patent Application Laid-Open Nos. 247745/2001 (JP-2001-247745A), 131386/2001 (JP-2001-131386A), 311302/1996 (JP-8-311302A) and 86614/1984 (JP-59-86614A), U.S. Pat. Nos. 5,455,042, 5,407,996 and 5,338,815), and trade names "Noniolex" and "Cleatech" manufactured by Showa Denko K.K.), and others.

The nitrogen-containing compounds may be used singularly or in combination.

As described above, in one particular embodiment, the preferred nitrogen-containing compound includes a guanamine compound (e.g., adipoguanamine, and CTU-guanamine), melamine or a derivative thereof [particularly, melamine or a melamine condensate (e.g., melam, and melem)], a guanidine derivative (e.g., cyanoguanidine, and creatinine), a urea derivative [e.g., biurea, a condensate of urea with formaldehyde, allantoin, and a metal salt of allantoin (such as allantoin dihydroxyaluminum)], a hydrazine derivative (e.g., a carboxylic acid hydrazide), a nitrogen-containing resin [e.g., an amino resin (an amino resin such as a melamine resin or a melamine-formaldehyde resin; a crosslinked amino resin such as a crosslinked melamine resin), a polyamide resin, a poly(meth)acrylamide, a poly(N-vinylformamide), a poly(N-vinylcarboxylic acid amide), and a poly(vinyllactam)]. Among them, in particular, combination use of at least one member selected from the group consisting of biurea, allantoin, a metal salt of allantoin, a carboxylic acid hydrazide and a polyamide resin, and a guanamine compound having a unit represented by the above-mentioned formula (I) can bring in significant reduction of an amount of formaldehyde generated from the shaped article. The nitrogen-containing compound may be used as a resin master batch containing the compound [in particular, the carboxylic acid hydrazide (e.g., at least one member selected from the group consisting of the aliphatic carboxylic acid hydrazide and the aromatic carboxylic acid hydrazide)]. The nitrogen-containing compound [for example, the urea compound (e.g., biurea), and the carboxylic acid hydrazide (e.g., at least one member selected from the group consisting of the aliphatic carboxylic acid hydrazide and the aromatic carboxylic acid hydrazide)] may be used in the form of a master batch by melt-mixing the compound with a thermoplastic resin (e.g., a polyacetal resin, a styrenic resin, an acrylic resin, an olefinic resin, a polyamide-series resin, a polyurethane-series resin, and a polyester-series resin). The nitrogen-containing compound may be used as a resin master batch containing the compound.

In addition to the above components, the polymeric composition may contain various other additives and ingredients. For instance, the composition may contain colorants, light stabilizers, antioxidants, heat stabilizers, processing aids, gloss agents, and fillers.

Colorants that may be used include any desired inorganic pigments, such as titanium dioxide, ultramarine blue, cobalt blue, and other organic pigments and dyes, such as phthalocyanines, anthraquinones, and the like. Other colorants include carbon black or various other polymer-soluble dyes. The colorants can generally be present in the composition in an amount up to about 2 percent by weight.

Other additives that may be included in the composition include an ester of a polyhydric alcohol and at least one fatty acid. The fatty acid can have from about 10 to about 32 carbon atoms, while the polyhydric alcohol can have from about 2 to about 8 carbon atoms. Such alcohols include ethylene glycol, glycerol, butylene glycol, and pentaerythritol. Fatty acids that may be used include montanic acids.

Another possible additive is a metal salt of a short-chain carboxylic acid. The metal used to construct the metal salt, for instance, may comprise an alkali metal or an alkaline earth metal. The carboxylic acid may possess from about 3 to about 8 carbon atoms.

Still another additive that may be present in the composition is a sterically hindered phenol compound. Examples of such compounds, which are available commercially, are pentaerythrityl tetrakis[3-(3,5-di-tert-butyl-4-hydroxyphenyl)propionate] (Irganox 1010, BASF), triethylene glycol bis[3-(3-tert-butyl-4-hydroxy-5-methylphenyl)propionate] (Irganox 245, BASF), 3,3'-bis[3-(3,5-di-tert-butyl-4-hydroxyphenyl)propionohydrazide] (Irganox MD 1024, BASF), hexamethylene glycol bis[3-(3,5-di-tert-butyl-4-hydroxyphenyl)propionate] (Irganox 259, BASF), and 3,5-di-tert-butyl-4-hydroxytoluene (Lowinox BHT, Chemtura). Preference is given to Irganox 1010 and especially Irganox 245.

Light stabilizers that may be present in the composition include sterically hindered amines. Such compounds include 2,2,6,6-tetramethyl-4-piperidyl compounds, e.g., bis(2,2,6,6-tetramethyl-4-piperidyl) sebacate (Tinuvin 770, BASF) or the polymer of dimethyl succinate and 1-(2-hydroxyethyl)-4-hydroxy-2,2,6,6-tetramethyl-4-piperidine (Tinuvin 622, BASF). UV stabilizers or absorbers that may be present in the composition include benzophenones or benzotriazoles.

Fillers that may be included in the composition include glass beads, wollastonite, loam, molybdenum disulfide or graphite, inorganic or organic fibers such as glass fibers, carbon fibers or aramid fibers. The glass fibers, for instance, may have a length of greater than about 3 mm, such as from 5 to about 50 mm.

The composition can further include thermoplastic or thermoset polymeric additives, or elastomers such as polyethylene, polyurethane, polymethyl methacrylate, polybutadiene, polystyrene, or else graft copolymers whose core has been prepared by polymerizing 1,3-butadiene, isoprene, n-butyl acrylate, ethylhexyl acrylate, or mixtures of these, and whose shell has been prepared by polymerizing styrene, acrylonitrile or (meth)acrylates.

The present disclosure may be better understood with reference to the following examples.

EXAMPLE 1

The following example was conducted in order to demonstrate some of the advantages and benefits of the present invention.

Various compositions were tested to show the effects of each ingredient and synergistic combinations. The ingredients used were aluminum flakes, terpene phenol, polyethylene resin, and a formaldehyde scavenger, namely benzoguanamine. The polyethylene resin had a molecular weight in the range of 2,000 to 15,000.

Samples were produced by preblending the ingredients in a tumble type mixer. Preblended samples were compounded on either single-screw or twin-screw extruders at 195° C. and 100 rpm, and pelletized. Samples were pre-dried prior to molding at 140° C. for a minimum of two hours. Test specimens were then injection molded into plaques measuring 80×50×1 mm at a melt temperature of 195° C. and a mold temperature of 90° C. Test specimens were stored for 24 hours at 23° C. and 50% relative humidity prior to testing.

Formaldehyde emission was measured using standard test method VDA 275 (German Automakers Association recommendation No. 275). Two test specimens are suspended in a one liter glass bottle above 50 ml of distilled water on a stainless steel hook. The container with the specimens is heated in an air-circulating oven at 60° C. for three hours. The test specimens are removed from the test bottle and 5 ml of sample solution is placed into a test tube and heated at 95° C. for 10 minutes. Then 3 ml of acetylacetone and 3 ml of 20% strength ammonium acetate solution are added to the test tube. The formaldehyde together with the reagents forms a diacetyldihydrolutidine complex, whose absorption at 412 nm is determined photometrically. From the absorption, the concentration of formaldehyde in the sample solution is calculated and expressed in ppm.

The following samples were produced and tested.

The control samples were made from a commercially available UV stabilized acetal copolymer (trade name Celcon UV90Z from Ticona). Control 1 is a natural, uncolored version of Celcon UV90Z. Control 2 is a gray colored version using conventional pigments (titanium dioxide, carbon black, minor inorganic toner pigments) at typical concentration (<1% by weight).

Example 1 is Celcon UV90Z natural plus 6.4% of an aluminum flake pigment dampened with mineral oil. Such pigments are available from Silberline or Eckart. The resulting color was a gray metallic appearance.

Example 2 is Celcon UV90Z gray plus 0.75% of an unhindered phenolic resin (terpene phenolic resin supplied by Newport Industries under the trade name of Nures).

Example 3 is Celcon UV90Z gray plus 1.00% of a low molecular weight polyethylene polymer (supplied by Westlake under the Epolene trade name).

Example 4 is Celcon UV90Z natural plus 0.48% of the terpene phenolic resin of Example 2 and 1.12% of the low molecular weight polyethylene polymer of Example 3.

Example 5 is Celcon UV90Z natural plus 6.4% aluminum flake pigment, 0.48% of the terpene phenolic resin of Example 2 and 1.12% of the low molecular weight polyethylene polymer of Example 3.

Example 6 is Celcon UV90Z natural plus 6.4% aluminum flake pigment, 0.48% of the terpene phenolic resin of Example 2, 1.12% of the low molecular weight polyethylene polymer of Example 3, and 0.5% benzoguanamine supplied by AlzChem.

TABLE 1

| Composition | VDA 275 (HCHO ppm) |
| --- | --- |
| Control 1 | 21.4 |
| Control 2 | 28.7 |
| Example 1 | 7.1 |
| Example 2 | 7.7 |
| Example 3 | 7.6 |
| Example 4 | 5.6 |
| Example 5 | 3.0 |
| Example 6 | 1.0 |

Showing the two controls highlights the fact that adding conventional pigments to a typical polyacetal formulation increases the breakdown of the polymer as measured by increased formaldehyde emissions. As shown above, the aluminum flake alone significantly decreased formaldehyde emissions. In addition, combining the aluminum flake with the other components gave further reductions in formaldehyde emissions.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A method for reducing formaldehyde emission from a polymeric composition containing a polyacetal resin, the method comprising:
heating and molding the polymeric composition to produce a molded polymeric article, the polymeric composition comprising a polyacetal resin combined with an aluminum pigment, the polyacetal resin having an initial formaldehyde content of from about 20 ppm to about 150 ppm, wherein the polyacetal resin further comprises hemiformal terminal groups in amounts greater than 1.5 mmol/kg, the aluminum pigment comprising elemental aluminum, the polymeric composition further comprising an unhindered phenol polymer, the aluminum pigment being present in the polymeric composition in an amount sufficient to reduce formaldehyde emission, the molded polymeric article exhibiting a formaldehyde emission pursuant to VDA 275 of from about 1 ppm to about 7 ppm.

2. A method as defined in claim 1, wherein the polymeric composition further comprises a polyolefin resin.

3. A method as defined in claim 1, wherein the unhindered phenol polymer comprises a terpene phenol, the unhindered phenol being present in the composition in an amount from about 0.05 percent to about 2 percent by weight, the polymeric composition further comprising a polyethylene resin having a molecular weight of from about 2000 to about 15,000, the polyethylene resin being present in the composition in an amount from about 0.01 percent to about 4 percent by weight, the aluminum pigment being present in the composition in an amount from about 0.5 percent to about 12 percent by weight.

4. A method as defined in claim 3, wherein the molded polymeric article exhibits a formaldehyde emission pursuant to VDA 275 of from about 1 ppm to about 3 ppm.

5. A method as defined in claim 3, wherein the terpene polymer has the following formula:

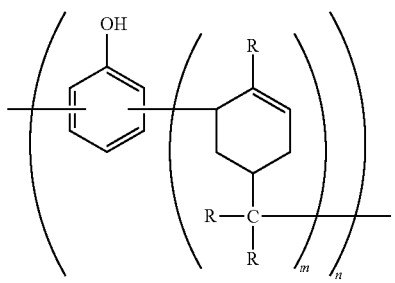

wherein R is a methyl group and m and n are integers indicating the respective degree of polymerization and are from about 2 to about 10.

6. A polymeric composition comprising:
a polymer matrix comprising a polyacetal resin, wherein the polyacetal resin comprises hemiformal terminal groups in amounts greater than 1.5 mmol/kg, the polymer matrix being blended with an aluminum pigment, the aluminum pigment comprising elemental aluminum, the polymeric composition further comprising an unhindered phenol polymer, the composition exhibiting a formaldehyde emission pursuant to VDA 275 of from about 1 ppm to about 3 ppm.

7. A polymeric composition as defined in claim 6, wherein the phenol comprises a terpene phenol.

8. A polymeric composition as defined in claim 7, wherein the terpene phenol has the following formula:

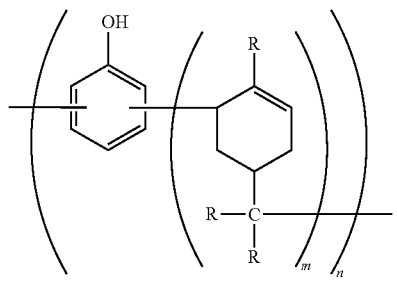

wherein R is a methyl group and m and n are integers indicating the respective degree of polymerization and are from about 2 to about 10.

9. A polymeric composition as defined in claim 6, wherein the polyacetal resin comprises a polyoxymethylene copolymer prepared from trioxane and a cyclic ether or a cyclic acetal.

10. A polymeric composition as defined in claim 6, wherein the aluminum pigment comprises aluminum flakes and is present in the composition in an amount from about 0.5 percent to about 12 percent by weight, and wherein the terpene phenol is present in the composition in an amount from about 0.05 percent to about 2 percent by weight.

11. A polymeric composition as defined in claim 10, wherein the composition further comprises a polyethylene resin, the polyethylene resin being present in the composition in an amount from about 0.01 percent to about 4 percent by weight.

12. A polymeric composition as defined in claim 9, wherein the aluminum pigment is present in the composition in an amount of from about 0.5 percent to about 12 percent by weight, wherein the terpene phenol is present in the composition in an amount of from about 0.05 percent about 2 percent by weight, and wherein the composition further comprises a polyethylene resin, the polyethylene resin being present in the composition in an amount of from about 0.01 percent to about 4 percent by weight.

13. A molded polymeric article produced from the polymeric composition defined in claim 1.

14. A method as defined in claim 1, wherein the polyacetal resin further comprises formyl terminal groups in amounts greater than 2.5 mmol/kg.

15. A polymeric composition as defined in claim 6, wherein the polyacetal resin further comprises formyl terminal groups in amounts greater than 2.5 mmol/kg.

* * * * *